(12) United States Patent
Merrill et al.

(10) Patent No.: US 6,939,499 B2
(45) Date of Patent: *Sep. 6, 2005

(54) PROCESSES AND APPARATUS FOR MAKING TRANSVERSELY DRAWN FILMS WITH SUBSTANTIALLY UNIAXIAL CHARACTER

(75) Inventors: William Ward Merrill, White Bear Lake, MN (US); Jeffery N. Jackson, Woodbury, MN (US); Andrew T. Ruff, Mendota Heights, MN (US); John A. Wheatley, Lake Elmo, MN (US); Dennis L. Krueger, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 432 days.

This patent is subject to a terminal disclaimer.

(21) Appl. No.: 10/156,347

(22) Filed: May 28, 2002

(65) Prior Publication Data

US 2002/0190406 A1 Dec. 19, 2002

Related U.S. Application Data

(60) Provisional application No. 60/294,940, filed on May 31, 2001.

(51) Int. Cl.[7] .................. B29C 49/08; B29C 55/00; B28B 11/08
(52) U.S. Cl. .................. 264/288.4; 264/290.2; 264/291
(58) Field of Search .................. 264/288.4, 290.2, 264/291

(56) References Cited

U.S. PATENT DOCUMENTS 2,473,404 A 6/1949 Young
2,618,012 A 11/1952 Milne (Continued)

FOREIGN PATENT DOCUMENTS

| EP | 0 236 171 A1 | 9/1987 |
|---|---|---|
| JP | 55-077530 | 6/1980 |
| JP | 56-49226 | 5/1981 |
| JP | 61-227019 | 10/1986 |
| JP | 2-89006 | 3/1990 |
| JP | 3-124426 | 5/1991 |
| JP | 3-182701 | 8/1991 |
| JP | 5-241021 | 2/1992 |
| JP | 5-288931 | 4/1992 |
| JP | 5-288932 | 4/1992 |
| JP | 5-11113 | 1/1993 |
| JP | 5-11114 | 1/1993 |
| JP | 5-150115 | 1/1993 |
| JP | 6-27321 | 2/1994 |
| JP | 6-34815 | 2/1994 |
| JP | 6-43321 | 2/1994 |
| JP | 6-51116 | 2/1994 |
| JP | 6-51119 | 2/1994 |
| WO | WO 95/17303 | 6/1995 |
| WO | WO 96/19347 | 6/1996 |
| WO | WO 99/36248 | 7/1999 |
| WO | WO 99/36812 | 7/1999 |
| WO | WO 00/29197 | 5/2000 |

OTHER PUBLICATIONS

Weber, Michael F., et al., "Giant Birefringent Optics in Multilayer Polymer Mirrors," *Science*, vol. 287, pp. 2451–2456 (Mar. 31, 2000).

*Primary Examiner*—Stephen J. Lechert, Jr.
(74) *Attorney, Agent, or Firm*—Anna A. Kobilansky

(57) ABSTRACT

A process for stretching films is described. The process preferably stretches films in a uniaxial fashion. Preferably, optical films are stretched including multilayer optical films. Other aspects of the invention include a roll of stretched film and an apparatus for stretching films.

31 Claims, 9 Drawing Sheets

U.S. PATENT DOCUMENTS

| | | | |
|---|---|---|---|
| 2,998,772 A | 9/1961 | Land | |
| 3,193,873 A | 7/1965 | Weinand | |
| 3,502,766 A | 3/1970 | Tsuruta et al. | |
| 3,577,586 A | 5/1971 | Kalwaites et al. | |
| 3,807,004 A | 4/1974 | Andersen | |
| 3,890,421 A | 6/1975 | Habozit | |
| 4,330,499 A | 5/1982 | von und zu Aufsesse et al. | |
| 4,349,500 A | 9/1982 | Yazawa et al. | |
| 4,434,128 A | 2/1984 | Okada et al. | |
| 4,525,317 A | 6/1985 | Okada et al. | |
| 4,853,602 A | 8/1989 | Hommes et al. | |
| 4,862,564 A | 9/1989 | Kwack | |
| 5,043,036 A | 8/1991 | Swenson | |
| 5,072,493 A | 12/1991 | Keegan et al. | |
| 5,517,737 A | 5/1996 | Viltro et al. | |
| 5,560,793 A | 10/1996 | Vegt et al. | |
| 5,699,188 A | 12/1997 | Gilbert et al. | |
| 5,825,543 A | 10/1998 | Ouderkirk et al. | |
| 5,826,314 A | 10/1998 | Aihara et al. | |
| 5,882,574 A | 3/1999 | Geisinger | |
| 5,962,114 A | 10/1999 | Jonza et al. | |
| 5,965,247 A | 10/1999 | Jonza et al. | |
| 6,096,375 A | 8/2000 | Ouderkirk et al. | |

PROCESSES AND APPARATUS FOR MAKING TRANSVERSELY DRAWN FILMS WITH SUBSTANTIALLY UNIAXIAL CHARACTER

This application claims the benefit of U.S. Provisional Application Ser. No. 60/294,940, filed May 31, 2001 which is incorporated herein by reference.

FIELD

The present invention relates to stretching films, particularly optical films and more particularly to optical films that are to be substantially uniaxially oriented. The present invention also comprises an apparatus suitable for stretching such films and the resultant films stretched by the apparatus.

BACKGROUND

There are a variety of reasons to stretch films. PCT WO 00/29197 discloses a method of biaxially stretching a polymeric film. The method may be used to impart mechanical characteristics to products such as film backing.

Stretching may enhance physical properties of crystalline plastic films. U.S. Pat. No. 2,998,772 discloses a machine for stretching film that includes circular discs that grasp edge portions of a film and stretch the film transverse to a machine direction of the film.

FIG. 1 illustrates a conventional tenter drawing process that stretches continuously fed films transversely to the direction of film travel. The film is gripped at both edges 2 by some gripping means, typically by tenter clips. The tenter clips are connected to tenter chains that ride along linearly diverging tenter tracks or rails. This arrangement propels the film forward in a machine direction of film travel and stretches the film. Thus an initial shape 4 in the film may be stretched to the shape 6.

Tenter apparatus are described in U.S. Pat. Nos. 2,618,012, 3,502,766, 3,890,421, 4,330,499; 4,525,317 and 4,853,602. Conventional tenters suffer many drawbacks. The angle of divergence in conventional tenters is typically small, usually less than 10 degrees. Boundary trajectories return to a parallel, or nearly parallel, state prior to quenching the polymeric film and slitting. Referring to FIG. 2, the unstretched portion 4 of the film shown in FIG. 1 may have dimensions T, W and L. After the film is stretched by a factor of lambda (7), the dimensions of that portion of film have changed to those shown on portion 6. This is not uniaxial stretch as described in greater detail below.

As used herein, the ratio of the final T' to initial thickness of the film T (see FIG. 10) may be defined as the normal direction draw ratio (NDDR). The machine direction draw ratio (MDDR) may be defined as the length of a portion of the film after stretching divided by the initial length of that portion. For illustrative purposes only, see Y'/Y in FIG. 11. The transverse direction draw ratio (TDDR) may be defined as the width of a portion of the film after stretching divided by the initial width of that portion. For illustrative purposes only, see X0/X in FIG. 9.

The NDDR is roughly the reciprocal of the TDDR in a conventional tenter, while the MDDR is essentially unchanged. This asymmetry in MDDR and NDDR draw causes differences in the various molecular, mechanical and optical properties of the film above and beyond the differences in properties between these directions and the stretch direction (TD). Illustrative examples of such properties include the crystal orientation and morphology, thermal and hygroscopic expansions, the small strain anisotropic mechanical compliances, tear resistance, creep resistance, shrinkage, the refractive indices and absorption coefficients at various wavelengths.

U.S. Pat. No. 4,862,564 discloses an apparatus for stretching a thermoplastic material web. The device includes an exponential or other curvilinear stretching profile. The apparatus provides a constant rate of stretch to the web, as opposed to the sharp peak and varying rate of stretch provided with conventional straight course tenter apparatus.

Uniaxially drawn films have superior performance to simply monoaxially drawn films. For example, uniaxially drawn films are more easily fibrillated or torn along the stretch direction (TD). In optical applications, matching the MD and ND indices of refraction is often advantageous. For example, U.S. Pat. Nos. 5,882,774; 5,962,114; and 5,965,247 (Jonza, et. al.) disclose materials with matched indexes of refraction for improved off-normal angle performance in brightness enhancement applications of multilayer reflective polarizers.

FIG. 3 illustrates a known batch technique for stretching a multilayer film suitable for use as a component in an optical device such as a polarizer. The flat, initial film 3 is stretched uniaxially in the direction of the arrows. The central portion necks down so that two edges of the film are no longer parallel after the stretching process. Much of the stretched film 5 is unusable as an optical component. Only a relatively small central portion 9 of the film is suitable for use in an optical component such as a polarizer. The yield and usable part size from this process are small.

Japanese Unexamined Patent Publication Hei 5-11114 teaches that compensation films with matched MD and ND indices of refraction allow wider viewing angles in liquid crystalline displays.

A conventional method for attempting to make a uniaxially drawn film is to use a length orienter (L.O.) that draws the film longitudinally in MD across at least one span between rollers of differing speed. The MDDR imparted along this span or draw gap is essentially the ratio of the speed of the downstream roll to the upstream roll. Because the film freely spans the rollers without edge constraints, the film can neck down in width as well as thin in caliper as it draws. Thus the TDDR can be reduced substantially below unity and can possibly be made to equal the NDDR. The method is fraught with difficulties and limitations. One disadvantage is the limitation on part size. An initial web of given width is reduced in width by a factor of the square root of the reciprocal of MDDR. Thus a final film made with an L.O. has a substantially reduced width. When contrasted to a film made by a tenter, which increases the width by roughly the TDDR (excluding edge losses from gripping), the L.O. under uniaxial conditions reduces the possible part size substantially.

Stretching longitudinally tends to amplify machine direction propagated caliper imperfections such as die lines. In order to achieve a high degree of uniaxial character, the L.O. needs a long span relative to the film initial width. Practically, this requires a large device and long film spans that may be hard to control.

Japanese Unexamined Patent Publication Hei 6-34815 points out another limitation of making films for optical applications over rollers. This document points out that rollers can scratch or otherwise damage the surface of the film. Films with delicate coatings or with soft skin layers could be easily deleteriously impacted.

In Japanese Unexamined Patent Publication Hei-150115, the effective initial width is reduced by introducing MD oriented slits into the film in a periodic fashion. This method even more severely limits the available part width.

There have been many attempts to draw films in a uniaxial fashion. Japanese Unexamined Patent Publication Nos. Hei 5-288931, 5-288932, 6-27321 and 6-34815 (H. Field, et. al.) describe methods where film is fed into clips whose gripping surfaces form an out-of-plane waveform. Since the actual contour length along MD of the film is much longer than the in-plane projection of that contour length along MD of the tenter, the actual rate of film fed in is higher than its planar projection. The film is initially fed in a similar out-of-plane waveform (e.g. it is corrugated). The method makes use of the MD tension that develops during draw to take up the slack of the corrugation and flatten the final film. In a variation, the film is drawn normally and then placed in the waveform clips. Heat treatment under tension after draw and the resulting shrinkage forces are then relied on to flatten the web. The method is described in conjunction with polysulfone films at low levels of overfeed (under 20%). The method is likely limited by process issues such as the draw ratio range required and heat transfer. Many useful uniaxially oriented films require draw ratios in excess of 4. These in turn would require overfeeds in excess of 100%, resulting in deep out-of-plane folds that would be difficult to heat uniformly. For example, the heat transfer to the tops and bottoms of the folds could be much higher than in the center plane due to the closer proximity to the heating plenums. This would tend to limit line speeds. Such large folds could also collapse and stick to each other as the web strength weakened in the pre-heat needed to effect draw, thereby causing the method to fail. At low levels of overfeed, the method reports good flattening across the film. As the boundary waveform became deeper, it is believed that the yield and quality of the final film would be adversely impacted.

Japanese Unexamined Patent Publications, Hei 5-241021, 6-51116 and 6-51119 disclose clip gripping surfaces remaining in-plane during draw. The film is fed into the clips at an out-of-plane angle while the clips are moving around an out-of-plane radius. The out-of-plane radius creates a temporary increase in the separation between the individual clips. After rounding the curve, the clip gripping surfaces return in-plane, the clips remain separated but more closely spaced, and corrugated portions of the film provide extra slack lie between the clips. The method relies on the tension during draw to flatten the film in-plane. The method may suffer the disadvantages of large corrugations for high draw ratio conditions. Additionally, since the clips remain separated prior to draw, the edges of the film forming the initial corrugations are unsupported. As the drawing proceeds and stresses build, these unsupported edges begin to pull inwards towards the film centerline. Eventually large scallops form between the clips. The scallops not only make the edges unusable, but also create large caliper variations through the film. This adversely impacts the yield and quality of the final film.

Japanese Unexamined Patent Publications, Hei 5-11113 discloses decoupling the MD line speed from the instantaneous film MD velocity by making the process partly discontinuous in mass flow. Transversely oriented slits are introduced into the web. These allow central portions of the otherwise continuous film to pull away from each other, allegedly allowing more substantially uniaxially drawn material in these portions. This method puts severe limits on usable part size and yield.

U.S. Pat. No. 4,349,500 (Yazawa, et. al.) discloses a film fed between two rotating disks or wheels. The film is gripped by two continuous belts. The film and the disks all lie in the same plane. The film stretches transversely between the counter rotating disks as its edges follow the diverging circumferential edges of the disks. The divergence angle of the draw becomes large, and the MD velocity of the film slows by the cosine of this divergence angle. The belt speed remains constant. In this manner, the output velocity is reduced from the input velocity of the film. The film is released from its gripping belts and the film is taken up at the slower MD velocity.

The method discloses the adjustment of the separation distance between the centers of rotation of the disks and the size of the disks. One disadvantage of this method, discussed in U.S. Pat. No. 5,826,314, is the difficulty of maintaining good gripping of the film with the belt system. This would be particularly challenging in the stretching of films that develop high levels of drawing stress, e.g. polyesters drawn near their glass transition temperatures. It is believed that many materials used in this process would acquire a wrinkle or a non-uniaxially drawn permanent set using this method. For example, polyesters monoaxially drawn near their glass transitions while holding their MD lengths fixed may wrinkle rather than snap back in-plane when the final width is reduced in a succeeding step towards that anticipated for the substantially uniaxial case. Wrinkling also can occur when the MD reduction is applied too late in the TD drawing step.

Swenson U.S. Pat. No. 5,043,036 describes a canted wheel film drawing apparatus. Here the disks are no longer in-plane with the film and thus the sheet is stretched between out-of-plane boundary trajectories defined by the circumferences of the canted wheels. The method is described as a means of stretching films comprising elastomeric layers. As pointed out in U.S. Pat. No. 3,807,004, due to the developing MD tension along the progress of the draw, stretching between such out-of-plane curved surfaces causes the film surface to become saddle shaped. The central portion of the film straightens out as it is not directly held, as is the film at the boundary trajectories, and thus it draws along a different path than the edges. This non-uniform drawing can result in significant caliper and property variations across the web, and is a major disadvantage for drawing films along boundary trajectories that move out-of-plane.

U.S. Pat. No. 3,807,004 described a variety of methods for partially dealing with the saddle formation. Profiling the initial film thickness or temperature distribution is suggested as a means to uniform caliper, although property variations due to different drawing histories would remain. Alternatively, a support device could force the film in the central portion to conform to the curved out-of-plane trajectory. Friction and concomitant damage to the film surface might be reduced by various methods including an air cushion. Saddling also manifests in various operations with the aforementioned disk orienter as described in U.S. Pat. No. 4,434,128. A convex guide surface is used to counter the saddling. Damage to the film surface from the application of such methods is another disadvantage to the method. In particular, films used in optical applications are particularly sensitive to surface defects as may be caused by scuffing and other contact-related defects.

SUMMARY

The present invention comprises processes for stretching film to provide desirable properties (e.g. optical properties), films stretched according to such processes and apparatus for stretching films. In preferred embodiments, the invention addresses shortcomings of the prior art such as excessive thickness deviation across the width of desired use of the final film, excessive anisotropic property deviation from fiber symmetry across the width of desired use of the final film, wrinkles and other non-flat imperfections in the final film, and surface contacting that can cause surface damage to the final film.

In one aspect, the present invention includes a process for forming an optical film with predetermined optical properties, including the steps of providing a multilayer film having alternating layers of polymeric materials with predetermined optical properties, such that the film is defined in reference to a coordinate system of first and second orthogonal in-plane axes and a third mutually orthogonal axis in a thickness direction of the film; feeding the multilayer film to a stretcher; stretching the film along the first in-plane axis of the film with the stretcher while allowing contraction of the film in the second in-plane axis and in the thickness direction of the film, with the stretching achieved by grasping edge portions of the film and moving the edge portions of the film along predetermined paths which diverge to create substantially the same proportional dimensional changes in the second in-plane axis of the film and in the thickness direction of the film.

In one embodiment, the predetermined paths are shaped so as to create substantially the same proportional dimensional changes in the second in-plane axis of the film and in the thickness direction of the film. In a preferred embodiment, at least one of the edge portions of the film is moved along a predetermined path that is substantially parabolic.

In a different embodiment, the speed of the edge of the film is controlled to create substantially the same proportional dimensional changes in the second in-plane axis of the film and in the thickness direction of the film.

In another embodiment, at least one of the edge portions of the film is moved along a predetermined path at a substantially constant speed.

In a preferred embodiment, the process is a continuous process and the film is fed continuously to the stretcher. The film may be fed continuously to the stretcher from a roll, or the film may be extruded or coextruded in-line with the stretcher.

In another embodiment, the strain rate along the stretch direction of the first in-plane axis is not constant during at least a portion of the stretch.

Preferably, the proportional dimensional changes in the second in-plane axis of the film and in the thickness direction of the film are substantially the same throughout substantially all of the draw history.

In another embodiment, the edge portions of the film move along predetermined paths that lie substantially within a plane defined by the first and second in-plane axes.

In yet another embodiment, the edge portions of the film move along a predetermined path that is three-dimensional.

Preferably, the edge portions of the film move along predetermined paths that are substantially symmetrical about a center axis.

More preferably, the film has first and second major surfaces and the film is stretched without physically contacting the first and second major surfaces of the film except at the edge portions of the film.

In another aspect, the present invention includes a process for forming film with predetermined properties, including the steps of providing a film that is defined in reference to a coordinate system of first and second orthogonal in-plane axes and a third mutually orthogonal axis in a thickness direction of the film; feeding the film to a stretcher, stretching the film along the first in-plane axis of the film with the stretcher while allowing contraction of the film in the second in-plane axis and in the thickness direction of the film, with the stretching accomplished by grasping edge portions of the film and moving edge portions of the film along predetermined paths that are shaped to create substantially the same proportional dimensional changes in the second in-plane axis of the film and in the thickness direction of the film throughout substantially all of the stretching step.

In another aspect, the present invention includes a process for forming film with predetermined properties, including the steps of providing a film that is defined in reference to a coordinate system similar to that described above; feeding the film to a stretcher in a direction of travel of the film; stretching the film along the first in-plane axis of the film with the stretcher while allowing contraction of the film in the second in-plane axis and in the thickness direction of the film, with the stretching accomplished by grasping edge portions of the film and moving the edge portions of the film along substantially parabolic paths that diverge.

In a preferred embodiment, the present invention includes a continuous process for forming film with predetermined properties, including the steps of providing a film that is defined in reference to a coordinate system similar to that described above; continuously feeding the film to a stretcher in a direction of travel of the film; stretching the film along the first in-plane axis of the film with the stretcher while allowing contraction of the film in the second in-plane axis and in the thickness direction of the film, with the stretching accomplished by grasping edge portions of the film and moving the edge portions of the film along predetermined paths that diverge in such a way that the strain rate in the direction of the first in-plane axis is not constant during at least a portion of the stretching step.

In another aspect, the present invention includes a roll of optical film with predetermined optical properties defied in reference to a coordinate system of first and second orthogonal in-plane axes and a third mutually orthogonal axis in a thickness direction of the film, such that the roll of optical film is constructed by the process of continuously feeding a roll of film to a stretcher and continuously stretching the film along the first in-plane axis of the film with the stretcher while allowing contraction of the film in the second in-plane axis and in the thickness direction of the film to create substantially the same proportional dimensional changes in the second in-plane axis of the film and in the thickness direction of the film.

Preferably, the roll of optical film is a multilayer optical film having alternating layers of polymeric materials having predetermined optical properties.

More preferably, the roll of optical film has portions suitable for being incorporated into a polarizer. Even more preferably, the polarizer may be a reflective polarizer.

Preferably, the roll of film is constructed by the process of stretching the film so that substantially the same proportional dimensional changes in the second in-plane axis of the film and in the thickness direction of the film are created throughout substantially all of the stretching process.

In yet another aspect, the present invention is a stretcher for continuously processing film, including a means for receiving a continuous supply of film having predetermined properties, with the film being defined in reference to a coordinate system as described above; clamping means for grasping edge portions of the film; and stretching means for continuously moving the clamping means along predetermined paths that diverge so that the film is stretched along the transverse direction while allowing contraction of the film in the machine direction and the thickness direction, with the predetermined paths having shapes that are selected to create substantially the same proportional dimensional changes in the machine direction of the film and in the thickness direction of the film to impart predetermined optical properties into the film.

The stretcher preferably includes a means for receiving a supply of the film which includes a means for receiving the film from a roll of said film.

The stretcher also preferably includes take away means for removing the stretched film from the stretcher. In a preferred embodiment, the take away means includes means for severing the stretched film from rapidly diverging edge portions of the film and moving the stretched portion out of the stretcher.

BRIEF DESCRIPTION OF THE DRAWINGS

The invention may be more completely understood in the following detailed description of various embodiment of the invention in connection with the accompanying drawings, in which.

Figure 1:
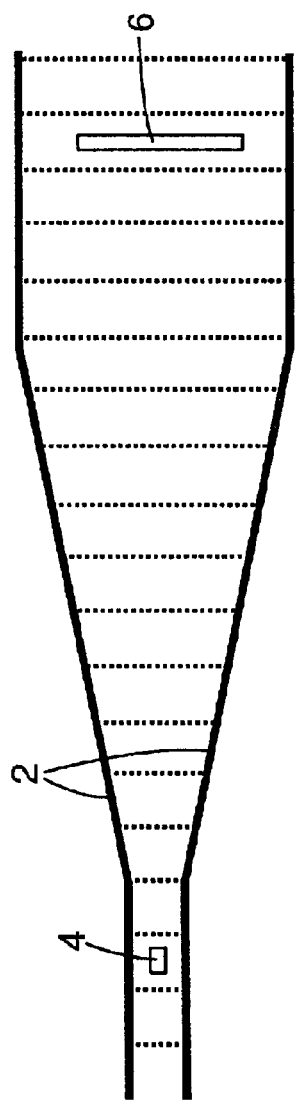
FIG. 1 is a schematic top view of a prior art tenter apparatus used to stretch film.

The invention is amenable to various modifications and alternative forms. Specifics of the invention are shown in the drawings by way of example only. The intention is not to limit the invention to the particular embodiments described. Instead, the intention is to cover all modifications, equivalents, and alternatives falling within the spirit and scope of the invention as defined in the claims.

DETAILED DESCRIPTION

Figure 4:
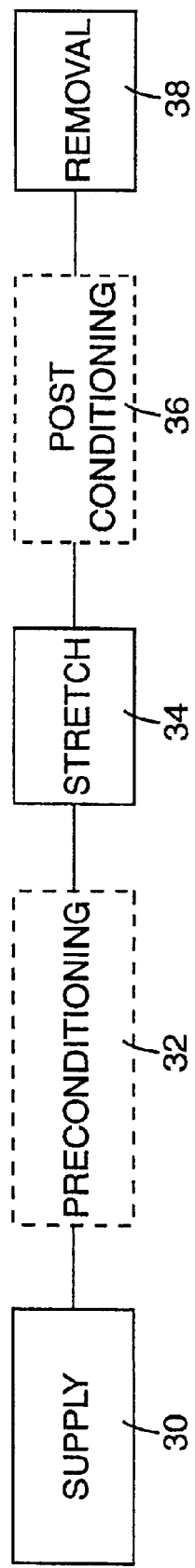
FIG. 4 is a block diagram showing steps according to one aspect of the present invention.

FIG. 4 is a block diagram of a process according to an aspect of the present invention. The process forms a film with predetermined properties.

The present invention is applicable generally to a number of different films, materials and processes. The present invention is believed to be particularly suited to fabrication of polymeric optical films where the visco-elastic characteristics of materials used in the film are exploited to control the amount, if any, of molecular orientation induced in the materials when the film is drawn during processing. As described below, consideration of the various properties of the materials used to produce optical films may be exploited to improve the optical films. The improvements include one or more of improved optical performance, increased resistance to fracture or tear, enhanced dimensional stability, better processability and the like.

A variety of optical films may be stretched or drawn according to the present invention. The films may comprise single or multi-layer films. Suitable films are disclosed, for example, in U.S. Pat. Nos. 5,699,188; 5,825,543; 5,882,574; 5,965,247; 6,096,375; and PCT Publication Nos. WO 95/17303; WO 96/19347; WO 99/36812; WO 99/36248 (the entire contents of each of which are herein incorporated by reference).

Films made in accordance with the present invention may be useful for a wide variety of products including polarizers, reflective polarizers, dichroic polarizers, aligned reflective/dichroic polarizers, absorbing polarizers, retarders (including z-axis retarders). The films may comprise the optical element itself or they can be used as a component in an optical element such as matched z-index polarizers used in beamsplitters for front and rear projection systems, or as a brightness enhancement film used in a display or microdisplay. It should also be noted that the stretcher described below in accordance with the present invention may be used with a length orienter to make a mirror from a multi-layer optical film A process for fabricating an optical film in accordance with one particular embodiment of the present invention will be described with reference to FIGS. 9, 10 and 11. These figures illustrate a portion of an optical film. The depicted optical film may be described with reference to three mutually orthogonal axes TD, MD and ND. In the illustrated embodiment, two orthogonal axes TD and MD are in the plane of the film (in-plane axes) and a third axis extends in the direction of the film thickness.

FIG. 4 is a block diagram of a process according to the present invention. In step 30, the film is supplied or provided to an apparatus for stretching the film. The process may optionally include a preconditioning step 32. The film is stretched in step 34. The film may optionally be post-conditioned in step 36. The film is removed from the stretching apparatus in step 38.

Figure 5:
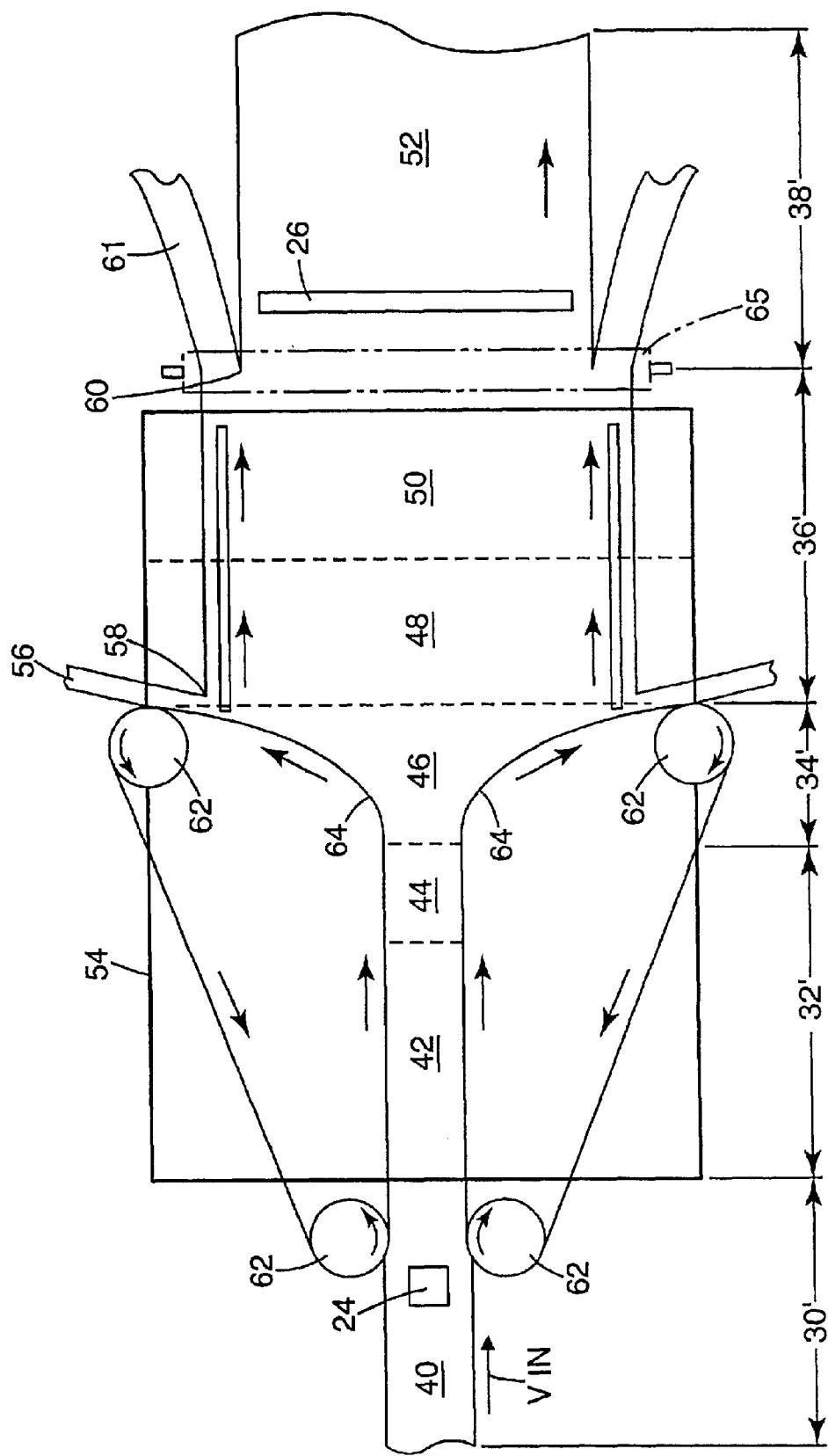
FIG. 5 is a schematic illustration of the stretching process according to a preferred embodiment of the present invention.
Figure 9:
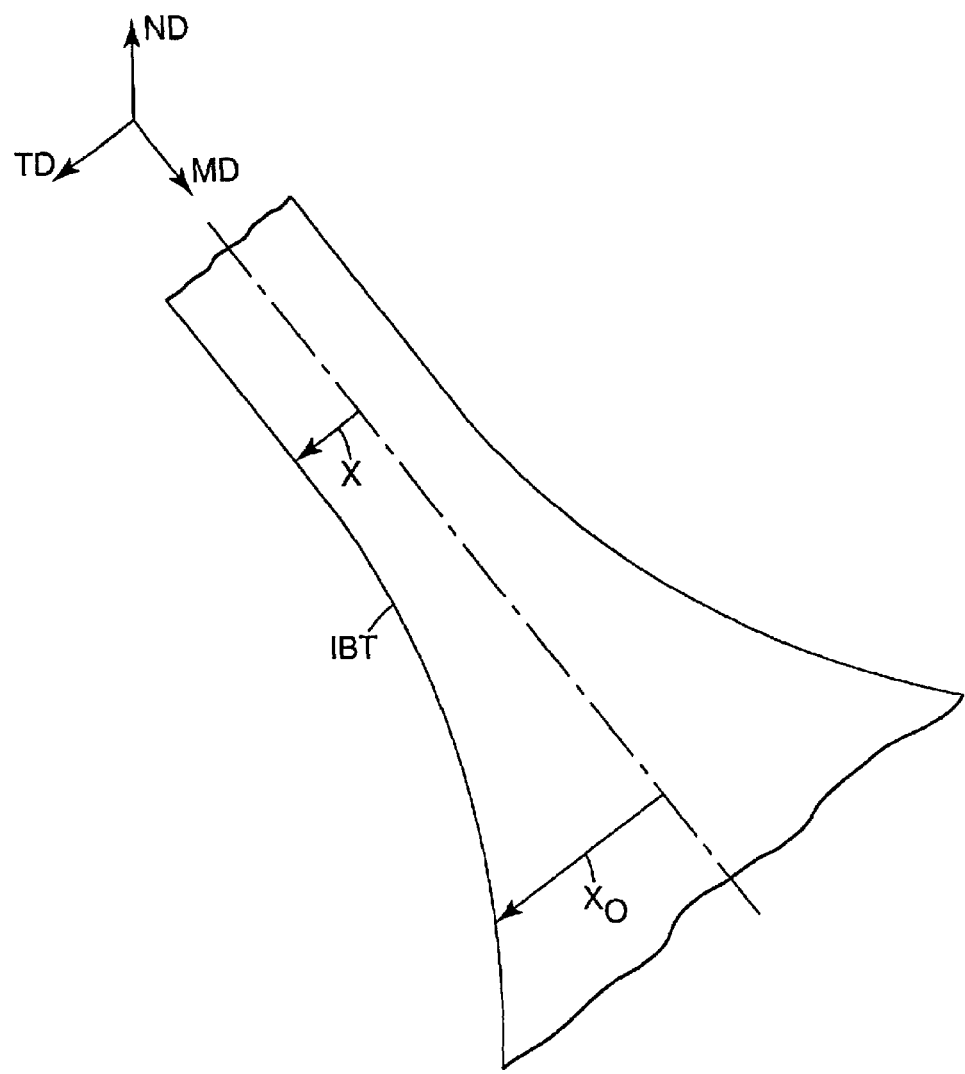
FIG. 9 is a schematic view of a stretched film illustrating a coordinate axis showing a machine direction (MD), a normal direction (ND) a transverse direction, an initial width X, a stretched width XO and a boundary trajectory IBT.
Figure 10:
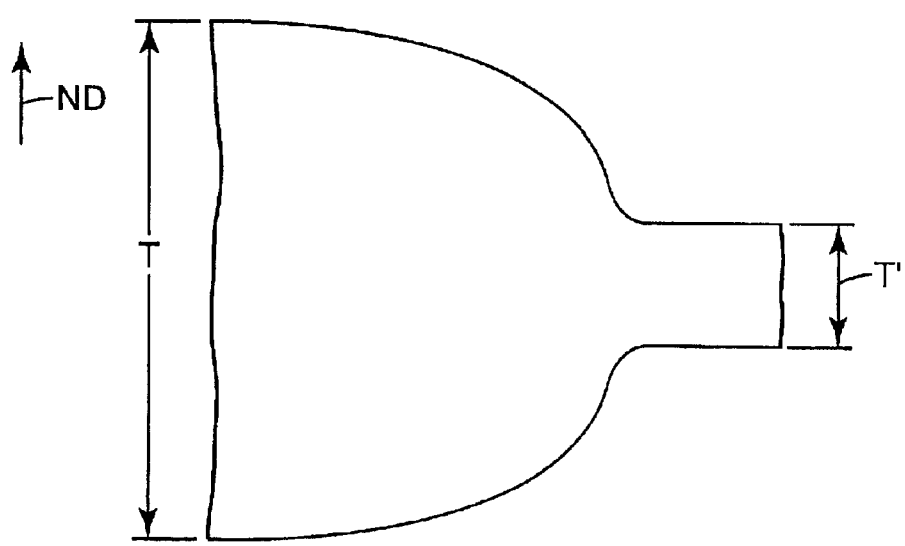
FIG. 10 is a side view of a stretched film illustrating an initial thickness T, a final thickness T' a the normal direction ND.
Figure 11:
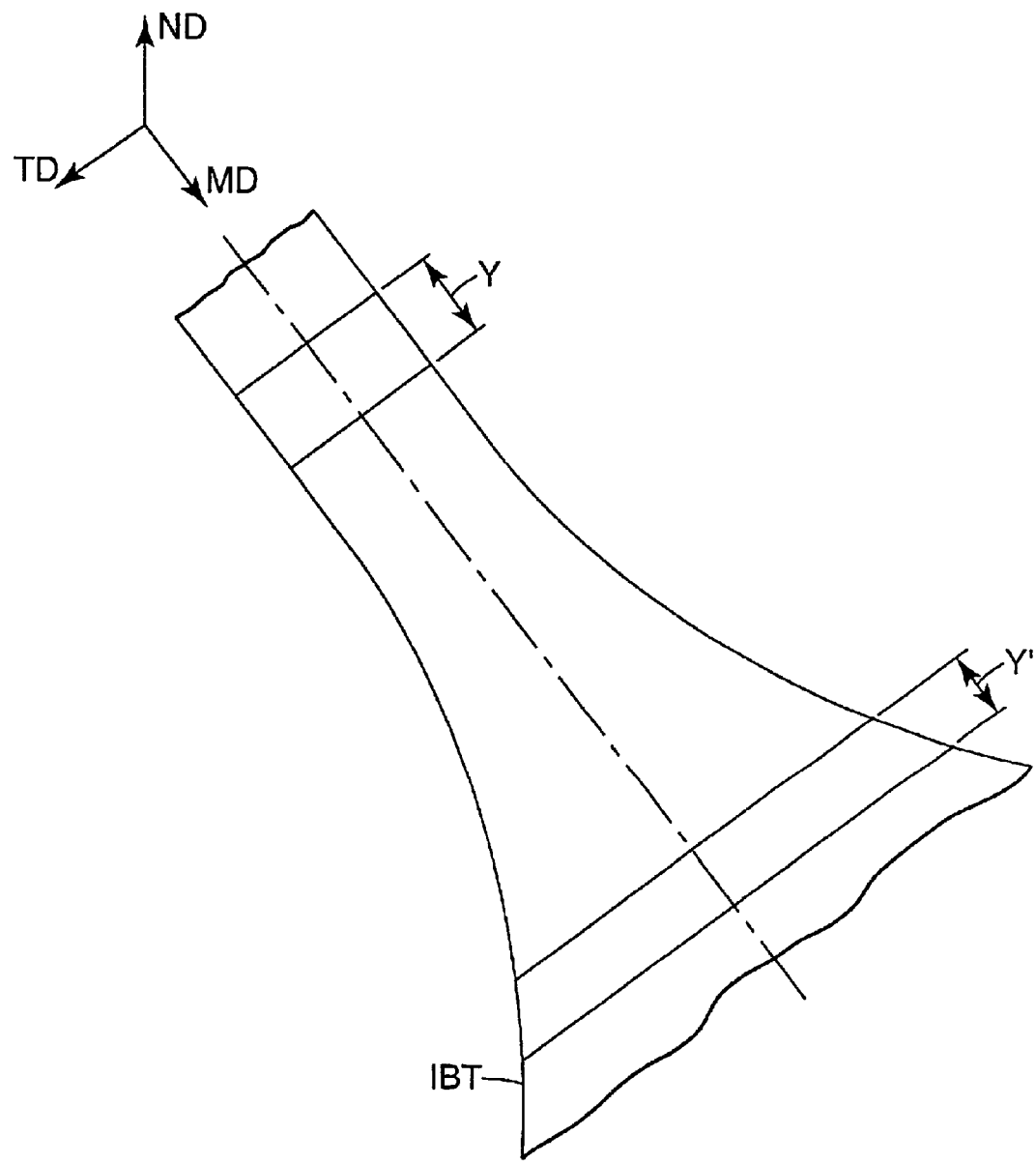
FIG. 11 is a schematic view of a stretched film illustrating a coordinate axis showing a machine direction (MD), a normal direction (ND) a transverse direction (TD), an initial length Y, a stretched length Y' and a boundary trajectory IBT.

FIG. 5 illustrates a preferred embodiment of the invention. The process includes the step of providing a film 40 to a stretching apparatus (see region 30'). As shown in FIGS. 9, 10 and 11, the film may be referred to with reference to a coordinate system of first and second orthogonal in-plane axes (e.g. machine direction MD and transverse direction TD) and a third mutually orthogonal axis in a thickness direction of the film (e.g. normal direction ND).

The process includes the steps of feeding the film 40 to a stretcher (see region 30'); stretching the film along the first in-plane axis of the film with the stretcher while allowing contraction of the film in the second in-plane axis and in the thickness direction of the film (see region 34'), with the stretching achieved by grasping edge portions of the film and moving the edge portions of the film along predetermined paths 64 which diverge to create substantially the same proportional dimensional changes in the second in-plane axis of the film and in the thickness direction of the film.

The process may optionally include a preconditioning step (see region 32') such as providing an oven 54 or other apparatus. The preconditioning step may include a preheating zone (see region 42 of the film) and a heat soak zone (see region 44).

The film is stretched in region 34'. Edges of the film may be grasped by mechanical clips that are moved by rollers 62 in the direction of the arrows. In a preferred embodiment, paths 64 are parabolic or substantially parabolic.

The process includes an optional post-conditioning step (see region 36'). For example, the film may be set in region 48 and quenched in region 50. A belt and rollers may optionally be used to progress the film in this region. A cut may be made at 58 and flash or unusable portion 56 may be discarded.

To maintain a substantially uniaxial draw throughout substantially all of the draw history (as shown in FIG. 5), at the end of the transverse stretch, the rapidly diverging edge portions 56 are preferably severed from the stretched film 48 at a slitting point 58.

Release of the selvages from a continuous gripping mechanism can be done continuously; however, release from discrete gripping mechanisms, such as tenter clips, should be done over discrete MD section of the film, e.g. all the material under any given clip is released at once. This discrete release mechanism may cause larger upsets in stress that may be felt by the drawing web upstream. In order to assist the action of the isolating takeaway device, it is preferred to use a continuous selvage separation mechanism in the device, e.g. the "hot" slitting of the selvage from the central portion of a heated, drawn film.

The slitting location is preferably located near enough to the "gripline", e.g. the isolating takeaway point of first effective gripper contact, to minimize stress upsets upstream of that point. If the film is slit before the gripping, instable takeaway can result, e.g. by film "snapback" along TD. The film is thus preferably slit at or downstream of the gripline. Slitting is a fracture process and, as such, typically has a small but natural variation in spatial location Thus it may be preferred to slit slightly downstream of the gripline to prevent any temporal variations in slitting from occurring upstream of the gripline. If the film is slit substantially downstream from the gripline, the film between the takeaway and boundary trajectory will continue to stretch along TD. Since only this portion of the film is now drawing, it now draws at an amplified draw ratio relative to the boundary trajectory, creating further stress upsets that could propagate upstream, e.g. undesirable levels of machine direction tension propagating upstream.

The slitting is preferably mobile and re-positionable so that it can vary with the changes in takeaway positions needed to accommodate variable final transverse draw direction ratio. An advantage of this type of slitting system is that the draw ratio can be adjusted while maintaining the draw profile simply by moving the take-away slitting point 58.

A variety of slitting techniques may be used included a heat razor, a hot wire, a laser, a focused beam of intense IR radiation or a focused jet of heated air. In the case of the heated jet of air, the air may be sufficiently hotter in the jet to blow a hole in the film, e.g. by heat softening, melting and controlled fracture under the jet. Alternatively, the heated jet may merely soften a focused section of the film sufficiently to localize further drawing imposed by the still diverging boundary trajectories, thus causing eventual fracture downstream along this heated line through the action of continued film extension. The focused jet approach may be preferred in some cases, especially when the exhaust air can be actively removed, e.g. by a vacuum exhaust, in a controlled fashion to prevent stray temperature currents from upsetting the uniformity of the drawing process. For example, a concentric exhaust ring around the jet nozzle may be used. Alternatively, an exhaust underneath the jet, e.g. on the other side of the film, may be used. The exhaust may be further offset or supplemented downstream to further reduce stray flows upstream into the drawing zone.

The process also includes a removal portion in region 38'. Optionally a roller 65 may be used to advance the film, but this may be eliminated. Preferably the roller 65 is not used as it would contact the stretched film 52 with the attendant potential to damage the stretched film. Another cut 60 may be made and unused portion 61 may be discarded.

Figure 2:
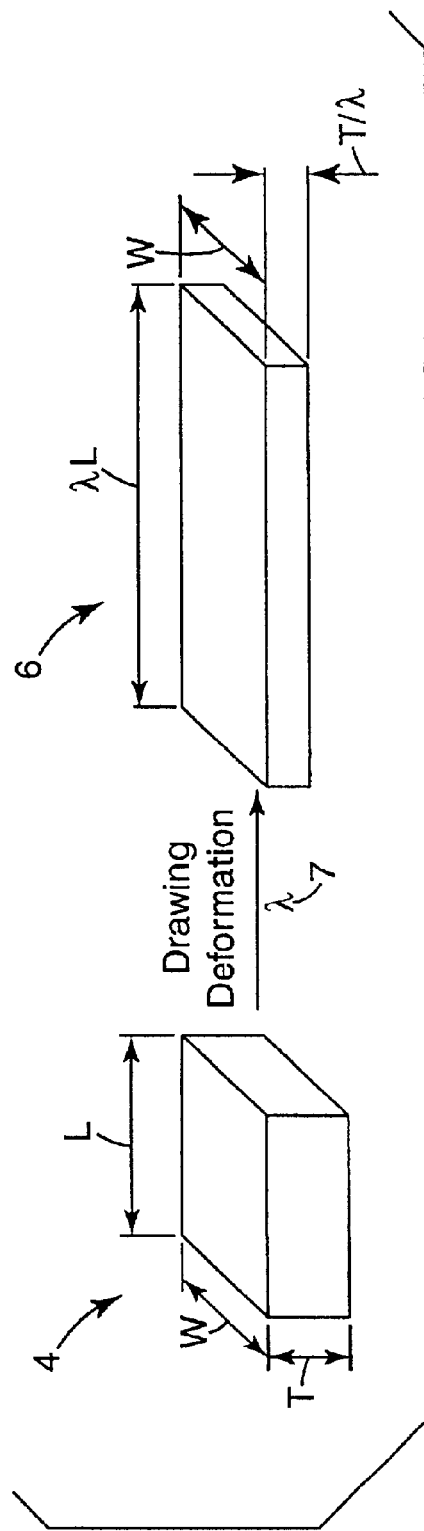
FIG. 2 is a perspective view of a portion of film in the prior art process depicted in FIG. 1 both before and after the stretching process.
Figure 3:
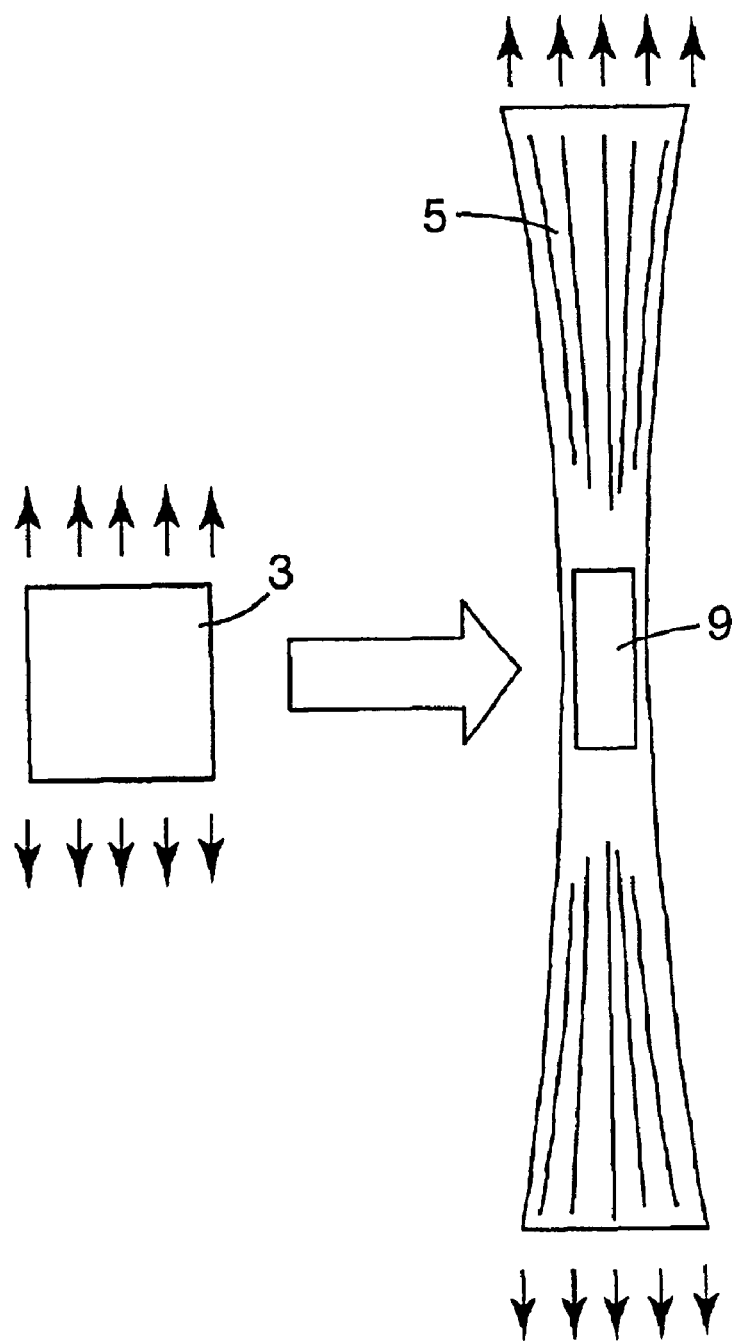
FIG. 3 is a schematic illustration of a prior art batch process for drawing a multilayer optical film showing the film both before and after the stretch.
Figure 6:
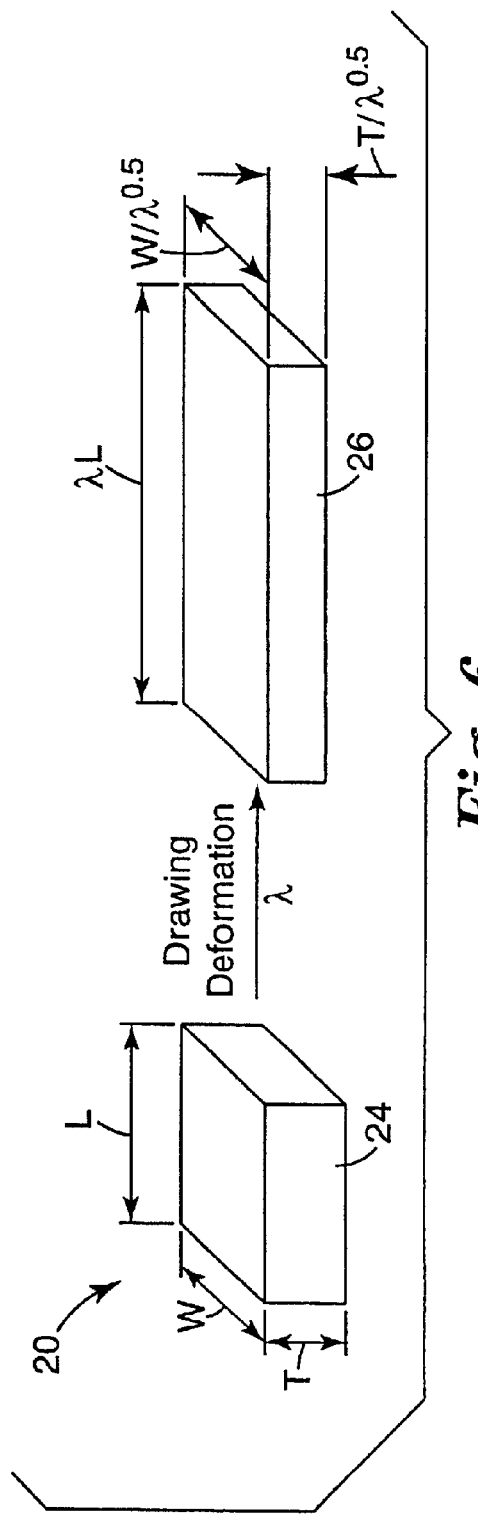
FIG. 6 is a perspective view of a portion of film in the process depicted in FIG. 5 both before and after the stretching process.

FIG. 6 helps illustrate what is meant in this application when it is said that the process "creates substantially the same proportional dimensional changes in the second in-plane axis of the film and in the thickness direction of the film". Three dimensional element 24 represents an unstretched portion of film (see e.g. FIGS. 5 and 6) with dimensions T, W and L. Three dimensional element 26 represents element 24 after it has been stretched a length lambda. As can be seen in FIG. 6, the thickness and width have been reduced by the same proportional dimensional changes. FIG. 6 represents a uniaxial stretch, as opposed, for example, to the non-uniaxial stretch shown in FIG. 2.

The present invention is not limited to perfect uniaxial stretching. Instead, the present invention includes processes, apparatus and films that are "substantially" uniaxially stretched. The following discussion and observations are provided to define what is within the scope of the present invention.

"Substantially" uniaxially drawn films preferably possess fiber symmetry in which the properties in MD and ND are similar within a given material layer (as films comprising multiple layers may not themselves possess fiber symmetry due to the layered natured of the film composite). This may exist in an elastic material when two of the draw ratios are equal. When one of the directions, e.g. TD, is stretched, then the other two directions, e.g. MD and ND, preferably have equal draw ratios. Assuming volume conservation, the MDDR and NDDR both should approach the square root of the reciprocal of the TDDR. Films drawn in a conventional tenter are not substantially uniaxially drawn even though they have been physically drawn in only one direction (so-called "monoaxial" drawing) because the boundary constraints of the process impart differences between MDDR and NDDR.

The present invention is also not limited to those processes that stretch film under uniaxial conditions throughout the entire history of the stretch or draw. In a preferred embodiment, the present invention addresses the inadequacy of prior art processes (e.g. the disk orienters) to provide the substantially uniaxial constraint on machine direction draw ratio (MDDR) and transverse direction draw ratio (TDDR) throughout the entire history of the draw. The failure of the prior art to provide the uniaxial condition throughout the draw is a cause of wrinkling and other out-of-plane defects in the final film.

In a preferred embodiment, the present invention provides a process in which a substantially uniaxial draw is provided via the boundary trajectories throughout the drawing step. More preferably, the process provides this history dependence while maintaining the film in-plane. However, the stretching step need not be performed within a substantially planar region (as depicted in FIG. 5). As discussed in more detail below, it is within the present invention to provide a boundary trajectory of the film that is three dimensional and substantially non-planar.

Preferably the present invention maintains the deviation from a uniaxial draw within certain tolerances throughout the various portions of the drawing step. Optionally, the present invention may maintain these conditions while deforming a portion of the film out-of-plane in an initial portion of the draw, but return the film in-plane during a final portion of the draw.

In a uniaxial transverse draw maintained throughout the entire history of the draw, the instantaneous MDDR equals the square root of the reciprocal of the TDDR. As discussed above in conjunction with a preferred embodiment of the present invention, the film may be drawn out-of-plane using out-of-plane boundary trajectories, i.e. boundary trajectories that do not lie in a single Euclidean plane. There are innumerable, but nevertheless particular, boundary trajectories meeting relational requirements of this preferred embodiment of the present invention, so that a substantially uniaxial draw history may be maintained using out-of-plane boundary trajectories.

The boundaries may be symmetrical forming mirror images through a central plane, e.g. a plane comprising the initial center point between the boundary trajectories, the initial direction of film travel and the initial normal to the unstretched film surface. In this preferred embodiment the film may be drawn between the boundary trajectories along a cylindrical space manifold formed by the set of line segments of shortest distance between the two opposing boundary trajectories as one travels along these boundary trajectories at equal rates of speed from similar initial positions, i.e., colinear with each other and the initial center point The trace of this ideal manifold on the central plane thus traces out the path of the film center for an ideal draw. The ratio of the distance along this manifold from the boundary trajectory to this central trace on the central plane to the original distance from the start of the boundary trajectory to the initial center point is the instantaneous nominal TDDR across the film spanning the boundary trajectories, i.e. the ratios of the half-distances between the current opposing points on the boundary trajectories and the half-distances between the initial positions of the opposing points on the boundary trajectories. As two opposing points move at constant and identical speeds along the opposing boundary trajectories, the corresponding center point on the central trace changes speed as measured along the arc of the central trace, i.e. the curvilinear MD. In particular, the central trace changes in proportion with the projection of the unit tangent of the boundary trajectory on the unit tangent of the central trace.

Uniaxial draw may be maintained along the entire history of the draw as long as the speed of the central point reduces at every point along the central trace from its initial speed by a factor of exactly the square root of the reciprocal of the instantaneous TDDR measured between the corresponding opposing points on the opposing boundary trajectories. This is the uniaxial condition when viewing the instantaneous MDDR of a differential film arc along the idealized central trace. The uniaxial condition may be achieved by controlling the ratio of the instantaneous rate of change of arc length along the central trace to the instantaneous rate of change of arc length at a corresponding opposing point on a boundary trajectory, i.e. the curvilinear MDDR. By maintaining this constraint, suitable boundary trajectories within the general class of three dimensional space curves may be found and specified within the context of this preferred embodiment of the present invention.

Preferably, the film is drawn in plane such as shown in FIG. 5. This avoids the problems of maintaining the central portions of the film to the idealized space manifold of draw. The design of the boundary trajectories is also simplified because the in-plane constraint reduces the number of variables. There is one pair of mirror image opposing boundary trajectories that maintains the uniaxial condition throughout the process of the draw. The design of the boundary trajectory may proceed by considering the instantaneous in-plane draw ratios MDDR and TDDR rather than the MDDR or MD speed as defined along the curvilinear central trace. The result is a pair of mirror symmetric in-plane parabolic trajectories diverging away from the in-plane MD centerline between them. The parabola may be portrayed by first defining the TD as the "x" direction and the MD as the "y" direction. The MD centerline between the opposing bounding parabolas may be taken as the y coordinate axis. The coordinate origin may be chosen as the initial centerpoint of the central trace between the parabolic trajectories and the left and right bounding parabolas are chosen to start at minus and plus $X_0$, respectively, where y=0. The right bounding parabolic trajectory, for positive y values, that embodies this preferred embodiment of the invention is (equation 1):

$$x/x_0 = (1/4)(y/x_0)^2 + 1$$

The left bounding parabolic trajectory is obtained by multiplying the left-hand side of the above equation 1 by minus unity.

The parabolic trajectory of equation 1 provides the uniaxial condition. As such it represents the in-plane drawing state in which MD tension should be negligible. In order to obtain good yield and property uniformity across the usable width of the final film, the principal axes of molecular orientation and of the resulting properties as induced by the draw preferably remain nearly constant. In this case, straight lines drawn along TD, the principal draw direction, remain substantially straight after drawing. In tenter processing of biaxially oriented films, this is typically not the case.

It should be again noted that the present invention is not limited to perfectly uniaxially drawn films. In practice, nearly or "substantially" uniaxially drawn films are sufficient to make components of sufficient desired properties. Often, the uniformity of such films is more important than the precise manifestation of uniaxial character. A discrepancy in uniaxial character in properties such as refractive index is tolerable in many applications. For example, the off-angle characteristics of reflective polarizers used in liquid crystalline display applications is strongly impacted by the difference in the MD and ND indices of refraction when TD is the principal mono-axial draw direction. An index difference in MD and ND at 633 nm of 0.08 may be acceptable in some applications. A difference of 0.04 is allowable in others. In more stringent applications, a difference of 0.02 or less is preferred. Thus preferred embodiments of films according to the present invention include the class of nearly or substantially uniaxially drawn films, processes for creating such substantially uniaxially drawn films and apparatus for creating such substantially uniaxially drawn films.

A preferred method for calculating trajectories within a specified envelope of nearly or substantially uniaxial character is discussed The method determines the "right" boundary trajectory directly, and the "left" boundary trajectory is taken as a mirror image. First, the envelope constraint is set by defining an instantaneous functional relationship between TDDR measured between the opposing boundary trajectories and the MDDR defined as the cosine of the non-negative divergence angle of those boundary trajectories, over a chosen range of TDDR. Next, the geometry of the problem is defined as described in the discussion of the parabolic trajectories. $X_1$ is defined as the initial half width between the boundary trajectories and ratio $(x/x_1)$ is identified as the instantaneous TDDR, where x is the current x position of an opposing point on the boundary trajectory. Next, the instantaneous functional relationship between the TDDR and MDDR is converted to a relationship between TDDR and the divergence angle. Next, the boundary trajectory is constrained to satisfy the differential equation, equation 2:

$$d(x/x_1)/d(y/x_1)=\tan(\theta)$$

where $\tan(\theta)$ is the tangent of the divergence angle $\theta$, and y is the y coordinate of the current position of the opposing point on the right boundary trajectory corresponding to the given x coordinate. Next, the differential equation may be solved, e.g. by integrating $1/\tan(\theta)$ along the history of the TDDR, $(x/x_1)$, from unity to the maximum desired value to obtain the complete coordinate set $\{(x,y)\}$ of the right boundary trajectory, either analytically or numerically. The divergence angle is the non-negative, smallest angle made between the direction of travel of the centerline of the film and the instantaneous boundary trajectory at (x,y). In the symmetric, in-plane case of equation 2, the travel of the center line is along MD, e.g. the divergence angle is zero, when the boundary trajectories are parallel to MD, as is nearly the case in a conventional tenter.

The method of a preferred embodiment of the present invention is illustrated by way of the parabolic trajectory example. First the envelope is chosen as the uniaxial constraint. The TDDR is shown to equal the square of the reciprocal of the cosine of the divergence angle. The TDDR is equal to the square of the tangent of the divergence angle plus unity. This allows direct substitution of the left-hand side of the equation by a function of TDDR only. The equation can then be analytically integrated to discover the result, equation 1.

In another preferred embodiment, let the extent of uniaxial character U, be defined by a simple ratio according to equation 3:

$$U=(1/MDDR-1)/(TDDR^{1/2}-1)$$

The state U=1 meets the uniaxial condition. States of U between zero and unity represent intermediate states in which some level of MD tension will develop. States near unity are nearly or substantially uniaxial. States of U greater than unity represent various levels of over-relaxing. These over-relaxed states effect an MD compression from the boundary edge. If the level of MD compression is sufficient for the geometry and material stiffness, the film will buckle or wrinkle.

The following discussion is also useful in understanding what is meant by a preferred "substantially" uniaxially drawn film in the context of the present invention. One class of preferred curves within an envelope of final film acceptability are those that maintain the extent of uniaxial character above a desired threshold value throughout the course of the draw, since in many final film applications, a final extent of uniaxial character less than unity can provide acceptable performance. For example, the extent of uniaxial character of 0.85 is sufficient in many cases to provide an index of refraction difference between the MD and ND directions in polyester systems comprising polyethylene naphthalate of 0.02 or less at 633 nm for mono-axially transverse drawn films. For some polyester systems, such as polyethylene terephthalate, a lower U value of 0.80 or even 0.75 may be acceptable, e.g. because of lower intrinsic differences in refractive indices in non-substantially uniaxially drawn films. When a specific value of U is chosen, Equation 3 provides a specific relationship between MDDR and TDDR which, when coupled with the aforementioned algorithm or method, specifies a broader class of boundary trajectories that also includes the parabolic trajectories as a limiting case when U approaches unity. Trajectories that exhibit values of U below unity for at least a final portion of the draw are referred to herein as sub-parabolic trajectories.

The condition of constant U less than unity may be approximated by a preferred class of in-plane "sub-parabolic" trajectories in which the parabolic trajectory of equation 1 is used with smaller initial effective web widths. If $x_1$ is still taken as the true effective half width of the drawable central portion of the web after effective gripping (i.e. the initial width minus the selvages held by the grippers which is the initial half distance between opposing boundary trajectories), then this class of trajectories is described by equation 4:

$$(x+c)/(x_1+c)=(1/4)(y/(x_1+c))^2+1$$

where "c" is a positive offset distance. This class of trajectories is a preferred approximation to constant U for TDDR under 8.

Still another class of boundary trajectories may be preferred in suppressing residual wrinkles. Because the uniaxial condition in the absence of shear provides a principal MD stress of zero, it is anticipated, using finite strain analysis, that the principal MD stress will actually go into slight compression under these conditions. Using finite strain analysis and a Neo-Hookean elastic solid constitutive equation, it is discovered that a suitable criterion for preventing compressive stresses may optionally be given by equation 5:

$$((TDDR)(MDDR))^{-4}+((TDDR)(MDDR))^{2}-(TDDR)^{-2}-(MDDR)^{-2}-\sin^{2}(\theta)((TDDR)(MDDR))^{-2}=0$$

MDDR is the cosine of the divergence angle. This optional method of the present invention then specifies this class of boundary trajectories.

The class of trajectories described above are illustrative and should not be construed as limiting. A host of trajectory classes are considered to lie within the scope of the present invention. The present invention preferably encompasses all nearly uniaxial boundary trajectories comprising a minimum value of U of about 0.70, more preferably approximately 0.75, still more preferably about 0.80 and even more preferably about 0.85. The minimum U constraint may be applied over a final portion of the draw defined by a critical TDDR preferably of about 2.5, still more preferably about 2.0 and more preferably about 1.5. Above a critical TDDR, certain materials, e.g. certain monolithic and multilayer films comprising orientable and birefringent polyesters, may begin to lose their elasticity or capability of snap back, e.g. because of the development of structure such as strain-induced crystallinity. The TDDR may coincide with a variety of material and process (e.g. temperature and strain rate) specific events such as the critical TDDR for the onset of strain-induced crystallization. The minimum value of U above such a critical TDDR could relate to an amount of non-uniaxial character set into the final film. As discussed above, it may be preferred to introduce a small level of MD tension into the film to suppress wrinkling. Preferably, the amount of such MD tension increases with decreasing U.

It may be preferred to increase the tension as the draw proceeds. For example, a smaller value of U earlier in the draw may tend to set more non-uniaxial character into the final film. Thus it may be advantageous to combine the attribute of various trajectory classes into composite trajectories. For example, the parabolic trajectory may be preferred in the earlier portions of the draw, while the later portions of the draw may converge on a trajectory of the more expanded parabola of equation 4 or the trajectory class of equation 5. In another arrangement, U may be taken as a non-increasing function with TDDR, as opposed to a prior art disk orienter that decreases U with TDDR.

The parabolic trajectory assumes a uniform spatial drawing of the film. Good spatial uniformity of the film may be achieved with many polymeric systems with careful control of the crossweb and downweb caliper (thickness) distribution of the initial, undrawn film or web, coupled with the careful control of the temperature distribution at the start of and during the draw. For example, a uniform temperature distribution across the film initially and during draw on a film of initially uniform caliper should suffice in most cases. Many polymeric systems are particularly sensitive to non-uniformities and will draw in a non-uniform fashion if caliper and temperature uniformity are inadequate. For example, polypropylenes tend to "line draw" under monoaxial drawing. Certain polyesters, notably polyethylene naphthalate, are also very sensitive.

The invention includes means for gripping the film, preferably the edges of the film. Preferably, the film is sandwiched between gripper faces on a mechanical clip assembly. The effective edge of the gripper face where the film is no longer effectively held defines the edge of the central portion of the film that will be drawn. This gripper edge defines a boundary edge for the drawing film. The motion of the gripper may also define a boundary trajectory that is, at least in part, responsible for the motion and drawing of the film (while other effects, e.g., downweb tension and take-up devices, may account for the rest of the motion and drawing.). Preferably, although not required, the gripper face edges are designed so that the center of the edge measured along one clip instantaneously follows the tangent of a chain riding along a rail or inside a channel cut into the rail. The boundary trajectory may also be defined by the rail when offset of the gripper edge face from the rail channel are included. In practice, the effective edge of the gripper face can be somewhat obscured by slight film slippage from or flow out from under the faces, but these deviations can be made small. Since the film is held by two sets of opposing grippers mounted on pairs of chains and rails, there are two opposing boundary trajectories. Preferably, these trajectories are mirror images about the MD center line of the drawing film.

The rails are traditionally formed by a series of straight segments whose angle of divergence, e.g. the angle formed between the boundary trajectories and the direction of film travel (e.g. MD), may be adjusted. Curved trajectories have also been explored.

Figure 7:
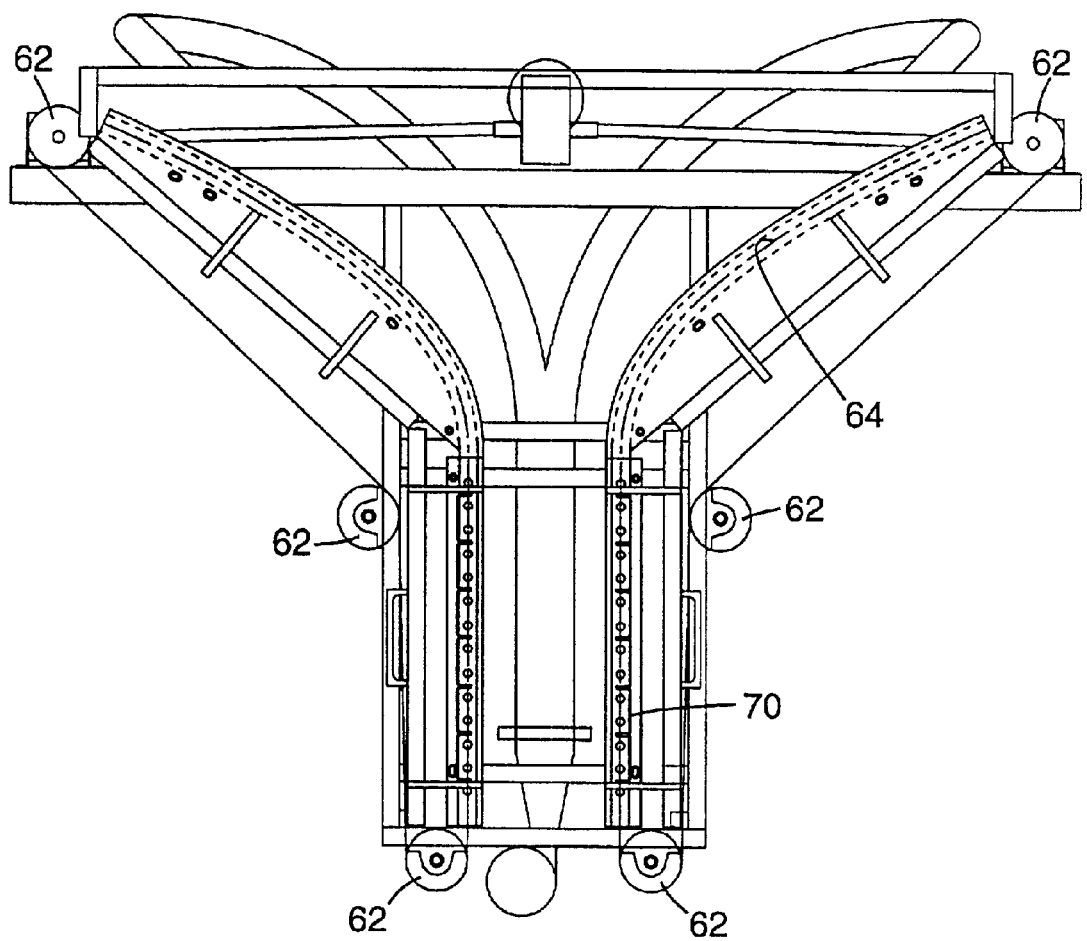
FIG. 7 is a schematic top view of a portion of a stretching apparatus according to one aspect of the present invention.
Figure 8:
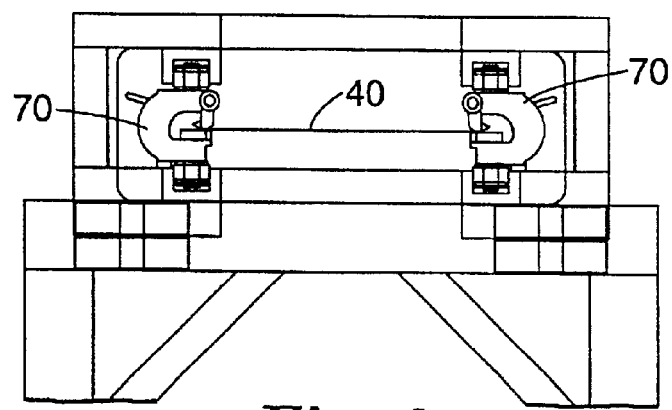
FIG. 8 is an end view of the apparatus of FIG. 7.

The means for gripping the film according to the present invention may be discrete or continuous in nature. FIGS. 7 and 8 illustrate details of a preferred embodiment of an apparatus for stretching films according to an aspect of the present invention. The gripping means comprise a series of tenter clips 70 that afford overall flexibility via segmentation. The discrete clips 70 are closely packed and attached to a flexible structure such as a chain. The flexible structure rides along or in channels along the trajectory control device, such as a rail Strategically placed cams and cam surfaces open and close the tenter clips at desired points. The clip and chain assembly may optionally ride on wheels or bearings or the like. Alternatively, the continuous gripping mechanism may comprise a flexible and continuous mechanism, such as a belt or tread. The flexible and continuous mechanism may nest or ride in a groove or a channel. Alternatively, a variety of other opposing, multiple belt methods, e.g. as described in U.S. Pat. No. 5,517,737 or in European patent Application 0236171 A1 (the entire contents of each of which are herein incorporated by reference) may be used. These may ride in grooves, or ride over bearings or some other means of underlying support allowing motion of the flexible continuous mechanism.

Preferred continuous gripping mechanisms provide the advantage of continuously following the changing boundary trajectories along every portion of the boundary edge. Segmented, discrete gripping systems are within the present invention and tend to only approximate the boundary trajectory along portions of the film at the boundary edges. For example, a tenter clip has a straight clip face edge. The clip is mounted so that the center of this clip face edge remains tangent to the boundary trajectory, e.g. tangent to the tenter rail, throughout the course of travel and draw. This means that the film gripped at the center does follow the boundary trajectory; however, the rest of the film gripped along the rest of the clip is constrained to a path deviating from the boundary trajectory, unless the boundary trajectory is straight. The film, at the edge, gripped by single clip would otherwise tend to exhibit the divergence angle at the clip center along the whole distance of the clip. As a result, film upstream of the clip face edge center would tend to have too large of a divergence angle relative to the intended boundary trajectories, while film downstream of the clip face edge center would tend to have too small of a divergence angle relative to the intended boundary trajectories. In accordance with the present invention, a small MD fluctuation in the film properties and uniaxial characteristics may develop. In practice, these MD fluctuations may be maintained small by using short enough clips for a given device. For example, the length of a clip face edge may preferably be no more that one-half, and more preferably no more than one-quarter, the total initial distance between the boundary trajectories. Smaller clips will in general provide better approximations to the boundary trajectories and smaller MD fluctuations.

Precise control of the divergence angle actually manifested by the gripper mechanism is a design consideration because it is the divergence angle that contributes to setting the condition for MDDR compatibility with the edge. The interactions of the stress field of the film with the boundaries may also tend to moderate approximation errors at the edges as one proceeds towards the film MD centerline. It may be useful in some case to reduce the gripper contact to less than the total length of the clip. For example, the film in between two sequential clips experiences a condition of under-approximated divergence angle from the leading edge of the upstream clip to over-approximated divergence angle from the trailing edge of the downstream clip. A slight relaxation of the contact areas at these edges could reduce sharp variations in MDDR and alleviate undesired stress fields that could cause defects. Loss of gripper action at a portion of the edge may be carefully balanced to reduce undue scalloping at the unsupported edge.

Optionally, the stretcher apparatus may direct airflow towards or into the boundary edge, e.g. to have air exhaust through the gripper region to improve heat transfer to the drawable film near the gripper faces. The apparatus may optionally apply active cooling to the gripper mechanism, e.g. to the clips, to maintain good gripping of the gripped portion of the film, e.g. by preventing flow out from under the gripper mechanism. The particulars of the active heating and cooling will help to establish the effective boundary edge region. Typically, it is preferred to have the boundary edge be reasonably approximated by the gripper face edges or by a small offset from these towards the film centerline. However, in some cases, e.g. where there is limited ability to control the shape of the boundary trajectories, it may be preferred to cool or keep cold a small edge region near the gripper face edges in order to adjust the effective boundary edge from that dictated by the boundary trajectory. In such cases, reasonable attention to adequate control of the temperature uniformity across the major central portion of the film would be desirable to maintain uniformity of the drawing.

The boundary trajectories may be fixed or adjustable. The underlying control of the boundary trajectories may be like the rails, a moving surface or some other means of support for a discrete or continuous system. The rails may also be segmented and adjustable in part or as a whole. For example, adjustment of the rails or underlying support for a belt system could be made either at junctions or by physical bending, and by various means.

The driving means can be any number of methods. For example, it can be the motion of the chain as propelled by gears connected to a drive, or the motion of the belt by an independent drive or by the motion of the underlying support, e.g. the disk in a disk orienter.

The means of release can be either a physical release of the selvages held by the gripping means or a physical separation of the selvages from a central portion of the drawn film.

Figure 12:
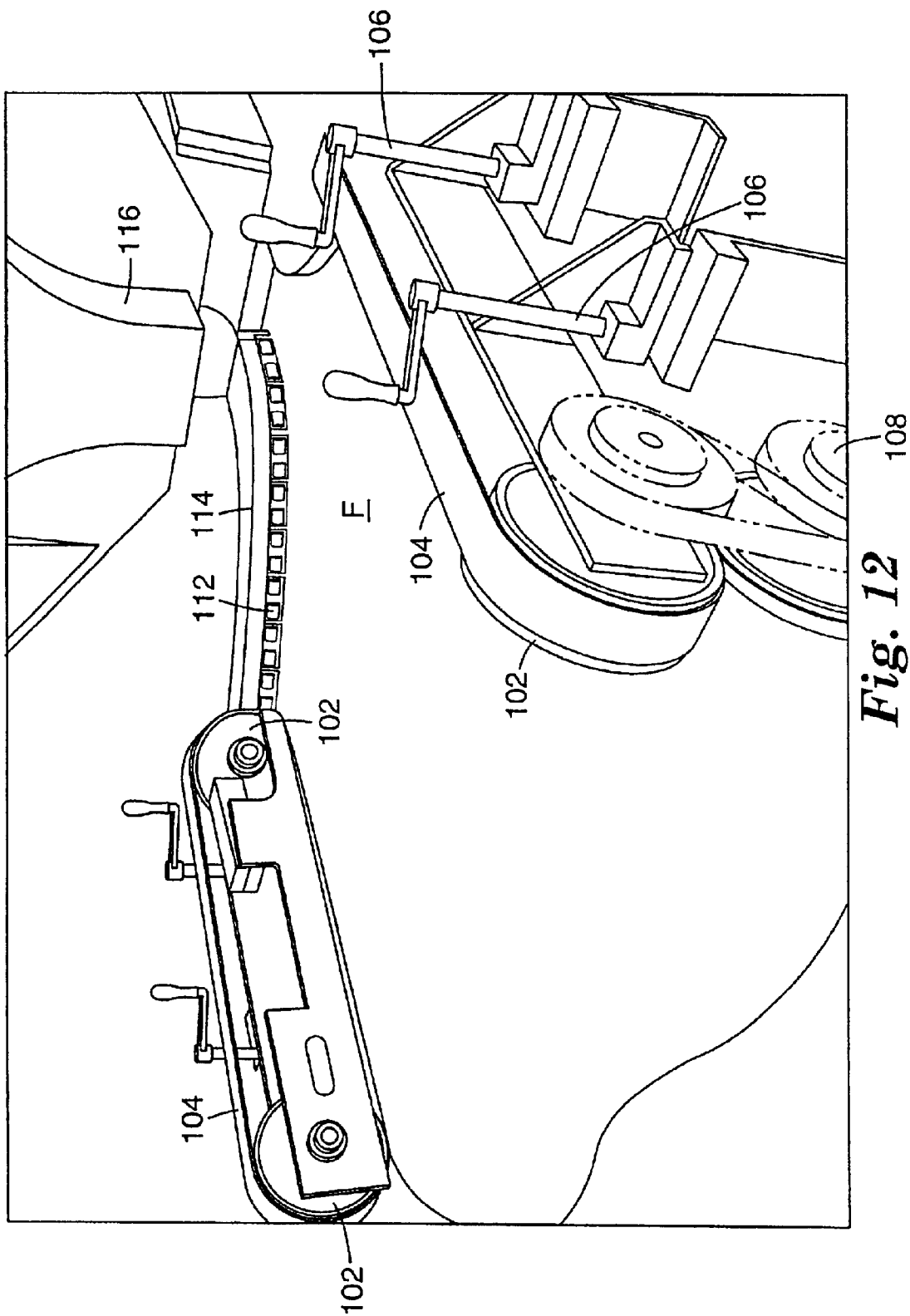
FIG. 12 is a perspective view of a take away portion of an apparatus according to an aspect of the present invention.

FIG. 12 illustrates a preferred take away means 100. The take away means comprises belts 104 and wheels 102. The takeaway means may include drive wheel 108 and adjustment arms 106. The takeaway means takes hold of at least a portion of the released film while preferably preventing damage to the usable portion of the film. The take-away device preferably provides a means of support while a heated film F quenches. The takeaway may also preferably comprise a means for controlling shrinkage in either the TD or MD direction or both Film leaving the takeaway device is typically wound on rolls for later use. Alternatively, direct converting may take place after take away. The take-away means may comprise any number of methods including a simple roller system with nips, wrap angles, vacuum assists, and the like. For optical films or those with sensitive coatings, a system comprising a top and bottom masking system such as a cover film lamination system may be included. This would protect the surface from the action of a roller system. Another attribute of the take-away system is a method of speed and or MD tension control so that the film can be removed in a manner compatible with the output speed. This take-away system could also be used to pull out any residual wrinkles in the film. The wrinkles could be initially pulled out during start up by a temporary increase in the takeaway speed above the output speed of the final, released portion of the drawn film, or the wrinkles could be pulled out by a constant speed above the output film speed during continuous operation.

In the above description, the position of elements has sometimes been described in terms of "upper", "lower", "over", "under", "right", "left", "top" and "bottom". These terms have been used merely to simplify the description of the various elements of the invention, such as those illustrated in the drawings. They should not be understood to place any limitations on the useful orientation of the elements of the present invention.

Accordingly, the present invention should not be considered limited to the particular examples described above, but rather should be understood to cover all aspects of the invention as fairly set out in the claims. Various modifications, equivalents, as well as numerous structures to which the present invention may be applicable will be readily apparent to those of skill in the art to which the present invention is directed upon review of the present specification. The claims are intended to cover such modifications and devices.

What is claimed is:

1. A method of processing a film, the method comprising:
conveying a film within a stretcher along a machine direction while holding opposing edge portions of the film; and
stretching the film within the stretcher by moving the opposing edge portions along diverging, substantially parabolic paths to form a stretched film.

2. The method of claim 1, wherein stretching the film comprises stretching the film to a draw ratio in excess of four within the stretcher by moving the opposing edge portions along diverging, substantially parabolic paths to form a stretched film.

3. The method of claim 1, wherein stretching the film comprises stretching the film under non-constant strain within the stretcher by moving the opposing edge portions along diverging, substantially parabolic paths to form a stretched film.

4. The method of claim 1, wherein the film has an initial thickness and initial width when conveyed into the stretcher and the stretched film has a stretched thickness and a stretched width; and
wherein, after stretching the film to a ratio of stretched width/initial width defined as $\lambda$, a ratio of stretched thickness/initial thickness is approximately $\lambda^{-1/2}$.

5. The method of claim 1, wherein the step of stretching the film comprises stretching the film within the stretcher by moving the opposing edge portions along diverging, substantially parabolic paths, wherein the paths are coplanar.

6. The method of claim 1, wherein the step of stretching the film comprises stretching the film within the stretcher by moving the opposing edge portions along diverging, substantially parabolic paths, wherein the paths are substantially symmetrical about a center axis of the film.

7. The method of claim 1, further comprising providing the film to the stretcher in a continuous manner from a roll of film.

8. The method of claim 1, further comprising extruding or coextruding the film in-line with the stretcher.

9. The method of claim 1, wherein the stretched film comprises at least one layer with indices of refraction in a length direction, corresponding to the machine direction, and a thickness direction that are substantially the same but substantially different from an index of refraction in a width direction.

10. The method of claim 1, further comprising releasing the edge portions of the film at an end of the substantially parabolic paths.

11. The method of claim 1, wherein the film comprises a multilayer film having a plurality of alternating layers of different polymeric composition.

12. The method of claim 1, wherein the minimum value of the extent of uniaxial character, U, is at least 0.7, wherein U is defined as $$U=(1/MDDR-1)/(TDDR^{1/2}-1)$$

wherein MDDR is the machine direction draw ratio and TDDR is the transverse direction draw ratio.

13. The method of claim 1, wherein the diverging, substantially parabolic paths have a functional form:

$$x/x_0=\pm((1/4)(y/x_0)^2+1)$$

wherein an x-axis is defined in a plane of the film and orthogonal to the machine direction with x=0 at a center axis of the film, a y-axis is defined in the plane of the film and along the machine direction with y=0 where stretching of the film commences within the stretcher, and $x_0$ is a distance of the edge portions from the center axis of the film when y=0.

14. The method of claim 1, wherein at least a portion of the diverging, substantially parabolic paths have a functional form:

$$(x+c)/(x_1+c)=\pm((1/4)(y/(x_1+c))^2+1)$$

wherein an x-axis is defined in a plane of the film and orthogonal to the machine direction with x=0 at a center axis of the film, a y-axis is defined in the plane of the film and along the machine direction with y=0 where stretching of the film commences within the stretcher, c is any number, and $x_1$ is a distance of the edge portions from the center axis of the film when y=0.

15. The method of claim 1, wherein the opposing edge portion of the film are substantially continuously supported.

16. A method of forming an optical film, the method comprising:
   forming a multilayer film comprising alternating layers of different polymeric compositions;
   conveying the multilayer film into a stretcher along a machine direction while holding opposing edge portions of the multilayer film; and
   stretching the multilayer film within the stretcher by moving the opposing edge portions along diverging, substantially parabolic paths to form a multilayer optical film.

17. The method of claim 16, wherein the multilayer optical film is a substantially uniaxially-oriented multilayer optical film.

18. The method of claim 16, wherein the multilayer film has an initial thickness and initial width when conveyed into the stretcher and the multilayer optical film has a stretched thickness and a stretched width; and
   wherein, after stretching the multilayer film to a ratio of stretched width/initial width defined λ, a ratio of stretched thickness/initial thickness is approximately $\lambda^{-1/2}$.

19. The method of claim 16, wherein the minimum value of the extent of uniaxial character, U, is at least 0.7, wherein U is defined as $$U=(1/MDDR-1)/(TDDR^{1/2}-1)$$

wherein MDDR is the machine direction draw ratio and TDDR is the transverse direction draw ratio.

20. The method of claim 16, wherein the diverging, substantially parabolic paths have a functional form:

$$x/x_0=\pm((1/4)(y/x_0)^2+1)$$

wherein an x-axis is defined in a plane of the multilayer film and orthogonal to the machine direction with x=0 at a center axis of the multilayer film, a y-axis is defined in the plane of the multilayer film and along the machine direction with y=0 where stretching of the multilayer film commences within the stretcher, and $x_0$ is a distance of the edge portions from the center axis of the multilayer film when y=0.

21. The method of claim 16, wherein at least a portion of the diverging, substantially parabolic paths have a functional form:

$$(x+c)/(x_1+c)=\pm((1/4)(y/(x_1+c))^2+1)$$

wherein an x-axis is defined in a plane of the multilayer film and orthogonal to the machine direction with x=0 at a center axis of the multilayer film, a y-axis is defined in the plane of the multilayer film and along the machine direction with y=0 where stretching of the multilayer film commences within the stretcher, c is any number, and $x_1$ is a distance of the edge portions from the center axis of the multilayer film when y=0.

22. A method of processing a film, the method comprising:
   conveying a film within a stretcher along a machine direction while holding opposing edge portions of the film; and
   stretching the film to a draw ratio in excess of four within the stretcher by moving the opposing edge portions along diverging, non-linear, coplanar paths to form a stretched film, wherein, during the stretching of the film, the minimum value of the extent of uniaxial character, U, is at least 0.8 over a final portion of the stretching after achieving a TDDR of 2.5 and U is less than 1 at the end of the stretching, wherein U is defined as $$U=(1/MDDR-1)/(TDDR^{1/2}-1)$$

wherein MDDR is the machine direction draw ratio corresponding to a divergence angle of the diverging paths and TDDR is the transverse direction draw ratio as measured between the diverging paths.

23. The method of claim 22, wherein the minimum value of the extent of uniaxial character is at least 0.85.

24. The method of claim 22, wherein the film comprises a multilayer film having a plurality of alternating layers of different polymeric composition.

25. The method of claim 22, wherein the step of stretching the film comprises stretching the film within the stretcher by moving the opposing edge portions along diverging non-linear paths, wherein the paths are in a plane of the film.

26. The method of claim 22, wherein the step of stretching the film comprises stretching the film within the stretcher by moving the opposing edge portions along diverging non-linear paths, wherein the paths are substantially symmetrical about a center axis of the film.

27. The method of claim 22, wherein the extent of uniaxial character, U, is at least 0.8 over a final portion of the stretching after achieving a TDDR of 2.0.

28. A method of processing a film, the method comprising:
conveying a film within a stretcher along a machine direction while holding opposing edge portions of the film; and
stretching the film within the stretcher by moving the opposing edge portions along diverging non-linear paths to form a stretched film, wherein, during the stretching of the film, the speed of the film along the machine direction decreases by a factor of approximately $\lambda^{1/2}$ where $\lambda$ is the transverse direction draw ratio.

29. The method of claim 28, wherein the film comprises a multilayer film having a plurality of alternating layers of different polymeric composition.

30. The method of claim 28, wherein the step of stretching the film comprises stretching the film within the stretcher by moving the opposing edge portions along diverging non-linear paths, wherein the paths are in a plane of the film.

31. The method of claim 28, wherein the step of stretching the film comprises stretching the film within the stretcher by moving the opposing edge portions along diverging non-linear paths, wherein the paths are substantially symmetrical about a center axis of the film.

* * * * *

UNITED STATES PATENT AND TRADEMARK OFFICE
CERTIFICATE OF CORRECTION

| | | |
|---|---|---|
| PATENT NO. | : 6,939,499 B2 | Page 1 of 2 |
| APPLICATION NO. | : 10/156347 | |
| DATED | : September 6, 2005 | |
| INVENTOR(S) | : Merrill, William W. | |

It is certified that error appears in the above-identified patent and that said Letters Patent is hereby corrected as shown below:

<u>Title page</u>
Item [56], References Cited, FOREIGN PATENT DOCUMENTS, delete "JP 56-49226" and insert -- JP 56-49223 -- therefor.

<u>Column 1</u>
Line 14, Delete "arc" and insert -- are -- therefor.

<u>Column 6</u>
Line 3, After "stretcher" delete "," and insert -- ; -- therefor.
Line 39, Delete "defied" and insert -- defined -- therefor.

<u>Column 7</u>
Line 53, After "ND" delete "," and insert -- ; -- therefor.

<u>Column 8</u>
Line 39, after "film" insert -- . --.

<u>Column 9</u>
Line 48, After "location" insert -- . --.

<u>Column 11</u>
Line 33, After "symmetrical" insert -- , --.
Line 44, After "point" insert -- . --.

<u>Column 13</u>
Line 6, After "discussed" insert -- . --.

<u>Column 16</u>
Line 10, After "rail" insert -- . --.

UNITED STATES PATENT AND TRADEMARK OFFICE
CERTIFICATE OF CORRECTION

PATENT NO. : 6,939,499 B2
APPLICATION NO. : 10/156347
DATED : September 6, 2005
INVENTOR(S) : Merrill, William W.

It is certified that error appears in the above-identified patent and that said Letters Patent is hereby corrected as shown below:

Column 17
Line 53, After "both" insert -- . --.

Column 19
Line 58, In Claim 18, after "defined" insert -- as --.

Signed and Sealed this

Eighteenth Day of July, 2006

JON W. DUDAS
*Director of the United States Patent and Trademark Office*